US010428790B2

(12) United States Patent
Smith

(10) Patent No.: US 10,428,790 B2
(45) Date of Patent: Oct. 1, 2019

(54) WIND TURBINE BLADES

(71) Applicant: Vestas Wind Systems A/S, Aarhus N. (DK)

(72) Inventor: Jonathan Smith, Hampshire (GB)

(73) Assignee: Vestas Wind Systems A/S, Aarhus N. (DK)

( * ) Notice: Subject to any disclaimer, the term of this patent is extended or adjusted under 35 U.S.C. 154(b) by 415 days.

(21) Appl. No.: 15/107,386

(22) PCT Filed: Dec. 15, 2014

(86) PCT No.: PCT/DK2014/050432
§ 371 (c)(1),
(2) Date: Jun. 22, 2016

(87) PCT Pub. No.: WO2015/096840
PCT Pub. Date: Jul. 2, 2015

(65) Prior Publication Data
US 2016/0319801 A1 Nov. 3, 2016

(30) Foreign Application Priority Data

Dec. 23, 2013 (DK) .................................. 2013 70816

(51) Int. Cl.
| F03D 1/06 | (2006.01) |
| B29C 70/54 | (2006.01) |
| B29D 99/00 | (2010.01) |
| B29C 70/44 | (2006.01) |
| B29L 31/08 | (2006.01) |
| B29K 75/00 | (2006.01) |
| B29K 105/04 | (2006.01) |

(52) U.S. Cl.
CPC ............ F03D 1/0675 (2013.01); B29C 70/44 (2013.01); B29C 70/547 (2013.01);
(Continued)

(58) Field of Classification Search
CPC .... F03D 1/065; F03D 1/067; B29C 70/44–48
See application file for complete search history.

(56) References Cited

U.S. PATENT DOCUMENTS 8,192,169 B2 * 6/2012 Piasecki .................. B23P 15/04
416/226
9,168,705 B2 * 10/2015 Bendel .................. B29C 66/721
(Continued)

FOREIGN PATENT DOCUMENTS

| EP | 1520983 A1 | 4/2005 |
| EP | 2404743 A1 | 1/2012 |

(Continued)

OTHER PUBLICATIONS

International Searching Authority, Search Report and Written Opinion Issued in Corresponding International Application No. PCT/DK2010/050432 dated Feb. 26, 2016.

(Continued)

*Primary Examiner* — Richard A Edgar
*Assistant Examiner* — Brian O Peters
(74) *Attorney, Agent, or Firm* — Wood Herron & Evans LLP

(57) ABSTRACT

A method of making an elongate wind turbine blade is described. The wind turbine blade extends longitudinally between a root end and a tip end in a spanwise direction, and the method comprises: (a) providing an elongate mould tool (20) extending longitudinally in a spanwise direction; (b) arranging an elongate spar structure (40) in the mould tool, the spar structure (40) N extending longitudinally in the spanwise direction; (c) arranging core material (24) adjacent to the spar structure (40); (d) providing resin-permeable material (114) between the spar structure (40) and the core material (24); and (e) administering resin into the mould during a resin infusion process. The resin-permeable material (114) restricts the flow of resin between the spar structure (40) and the core material (24) in the spanwise direction and thereby substantially prevents lock-offs from forming during the infusion process.

15 Claims, 5 Drawing Sheets

(51) Int. Cl.
*B29K 105/06* (2006.01)
*B29K 307/04* (2006.01)

(52) U.S. Cl.
CPC ...... *B29D 99/0028* (2013.01); *B29K 2075/00* (2013.01); *B29K 2105/04* (2013.01); *B29K 2105/06* (2013.01); *B29K 2307/04* (2013.01); *B29L 2031/085* (2013.01); *F05B 2220/30* (2013.01); *F05B 2230/21* (2013.01); *F05B 2230/30* (2013.01); *F05B 2280/6001* (2013.01); *F05B 2280/6003* (2013.01); *F05B 2280/6015* (2013.01); *Y02E 10/721* (2013.01); *Y02P 70/523* (2015.11)

(56) References Cited

U.S. PATENT DOCUMENTS

| | | | | |
|---|---|---|---|---|
| 2005/0136761 | A1* | 6/2005 | Murakami | B32B 5/26 442/59 |
| 2007/0217918 | A1* | 9/2007 | Baker | F03D 1/0675 416/227 R |
| 2011/0142667 | A1 | 6/2011 | Miebach et al. | |
| 2012/0237759 | A1* | 9/2012 | Ehbing | B32B 5/08 428/319.3 |

FOREIGN PATENT DOCUMENTS

| | | | |
|---|---|---|---|
| EP | 2444660 A1 | | 4/2012 |
| GB | 2497578 A | | 6/2013 |
| WO | 2006082479 A1 | | 8/2006 |
| WO | WO2013178228 | * | 5/2013 |

OTHER PUBLICATIONS

Danish Patent and Trademark Office, Search Report Issued in Application No. PA 2013 70816 dated Aug. 6, 2014.

* cited by examiner

WIND TURBINE BLADES

TECHNICAL FIELD

The present invention relates to an improved method of making a wind turbine blade and to a wind turbine blade made according to the method.

BACKGROUND TO THE INVENTION

FIG. 1 is a cross-sectional view of a wind turbine rotor blade 10. The blade has an outer shell, which is fabricated from two half shells: a windward shell 11a and a leeward shell 11b. The shells 11a and 11b are typically moulded from glass-fibre reinforced plastic (GRP). Parts of the outer shell 11 are of sandwich panel construction and comprise a core 12 of lightweight material such as foam (e.g. polyurethane) or balsa, which is sandwiched between inner 13 and outer 14 GRP layers or 'skins'. Other core materials will be apparent to persons skilled in the art.

The blade 10 comprises a first pair of load-bearing structures in the form of spar caps 15a and 15b and a second pair of load-bearing structures in the form of spar caps 16a, 16b. The respective pairs of spar caps 15a and 15b, 16a and 16b are arranged between sandwich panel regions of the shells 11a and 11b. One spar cap 15a, 16a of each pair is integrated with the windward shell 11a and the other spar cap 15b, 16b of each pair is integrated with the leeward shell 11b. The spar caps of the respective pairs are mutually opposed and extend longitudinally along the length of the blade 10.

A first longitudinally-extending shear web 17a bridges the first pair of spar caps 15a and 15b and a second longitudinally-extending shear web 17b bridges the second pair of spar caps 16a and 16b. The shear webs 17a and 17b in combination with the spar caps 15a and 15b and 16a and 16b form a pair of I-beam structures, which transfer loads effectively from the rotating blade 10 to the hub of the wind turbine. The spar caps 15a and 15b and 16a and 16b in particular transfer tensile and compressive bending loads, whilst the shear webs 17a and 17b transfer shear stresses in the blade 10.

Each spar cap 15a and 15b and 16a and 16b has a substantially rectangular cross section and is made up of a stack of pre-fabricated reinforcing strips 18. The strips 18 are pre-cured pultruded strips of carbon-fibre reinforced plastic (CFRP), and are substantially flat and of rectangular cross section. The number of strips 18 in the stack depends upon the thickness of the strips 18 and the required thickness of the shells 11a and 11b, but typically the strips 18 each have a thickness of a few millimetres and there may be between three and twelve strips in a stack. The strips 18 have a high tensile strength, and hence have a high load bearing capacity.

The blade 10 is made using a resin-infusion process as will now be described by way of example with reference to FIGS. 2 and 3. Referring to FIG. 2, this shows a mould 20 for a half shell of a wind turbine blade in cross-section. A glass-fibre layer 22 is arranged in the mould 20 to form the outer skin 14 of the blade 10. Three elongate panels 24 of polyurethane foam are arranged on top of the glass-fibre layer 22 to form the sandwich panel cores 12 referred to above. The foam panels 24 are spaced apart relative to one another to define a pair of channels 26 in between. A plurality of pultruded strips 18 of CFRP, as described above with reference to FIG. 1, are stacked in the respective channels 26. Three strips 18 are shown in each stack in this example, but there may be any number of strips 18 in a stack.

Referring to FIG. 3, once the strips 18 have been stacked, a second glass-fibre layer 28 is arranged on top of the foam panels 24 and the stacks of pultruded strips 18. The second glass-fibre layer 28 forms the inner skin 13 of the blade 10. Next, vacuum bagging film 30 is placed over the mould 20 to cover the layup. Sealing tape 32 is used to seal the vacuum bagging film 30 to a flange 34 of the mould 20. A vacuum pump 36 is used to withdraw air from the sealed region between the mould 20 and the vacuum bagging film 30, and resin 38 is supplied to the sealed region. The resin 38 infuses between the various laminate layers and fills any gaps in the laminate layup. Once sufficient resin 38 has been supplied to the mould 20, the mould 20 is heated whilst the vacuum is maintained to cure the resin 38 and bond the various layers together to form the half shell of the blade. The other half shell is made according to an identical process. Adhesive is then applied along the leading and trailing edges of the shells and the shells are bonded together to form the complete blade.

The integration of the spar caps 15a and 15b and 16a and 16b within the structure of the outer shells 11a and 11b avoids the need for a separate spar cap such as a reinforcing beam, which is typically bonded to an inner surface of the shell in many conventional wind turbine blades. Other examples of rotor blades having spar caps integral with the shell are described in EP 1 520 983, WO 2006/082479 and UK Patent Application GB 2497578.

When manufacturing wind turbine blades using a resin infusion process, it is important to control the resin flow front during the infusion process to ensure that the resin infuses evenly and completely throughout the laminate layup and between all of the shell components. If the flow front is not carefully controlled, then air pockets (also referred to as 'lock offs' or voids) may develop in the blade structure. Air pockets are caused by the incomplete infusion of resin in certain regions of the blade, and can result in localised weaknesses in the blade structure.

The present invention has been developed against this background, and provides an improved method of manufacturing a wind turbine blade. In particular, the invention provides increased control over the resin flow front during resin infusion and eliminates or at least significantly reduces the possibility of air pockets forming. The present invention resides both in the identification of the problem, and in the solution to the problem.

The particular problem identified by the inventors will now be described in detail with reference to FIGS. 4 to 8.

FIG. 4 is a schematic representation of a spar structure 40 for a wind turbine blade arranged between first and second foam panels 42a and 42b. Referring to FIG. 4, the spar structure 40 in this example is a spar cap and comprises a plurality of CFRP pultrusions 44 arranged one on top of another to form a stack. The foam panels 42a and 42b are made from polyurethane foam. The spar cap 40 and foam panels 42a and 42b are arranged side by side in a suitable mould, for example a wind turbine blade shell mould (not shown), as described previously by way of introduction with reference to FIG. 2. Both the spar structure 40 and the foam panels 42a and 42b extend longitudinally in the mould, in a generally spanwise direction. A resin inlet channel 46 is also shown in FIG. 4, and will be described in further detail later with reference to FIG. 7.

As shown in FIG. 4, a small gap 48 is present on each side of the spar cap 40, between the spar cap 40 and the adjacent foam panel 42a or 42b. Whilst the spar caps 40 and foam panels 42*a* and 42*b* are arranged in the mould in close abutment, a small gap 48 is inevitable for reasons as will now be explained with reference to FIGS. 5 and 6.

FIG. 5 is a schematic representation of a transverse cross section taken through a wind turbine blade shell mould 50. A spar cap 40 and adjacent foam panel 42 are also shown schematically inside the mould 50. The blade shell mould 50 has a concave curvature generally in the chordwise direction C, corresponding to part of the airfoil profile of the blade to be produced. The curvature of the mould 50 prevents the spar cap 40 and foam panel 42 from abutting closely across the entire interface 52 between the two components 40 and 42, and results in a longitudinally-extending gap 48 at the interface 52.

Referring now also to FIG. 6, this is a schematic representation of part of the spar cap 40. Here it can be seen that there may be a slight misalignment between the stacked pultrusions 44 comprising the spar cap 40. The misalignments are exaggerated for clarity in FIG. 6, and in practice any misalignment may only be a fraction of a millimetre. In any event, misalignment between the stacked pultrusions 44 results in the longitudinal sides of the spar cap 40 not being perfectly flat, and this also contributes to the longitudinally-extending gaps 48 between the spar cap 40 and the adjacent foam panel 42 at the interface 52 between the abutting components 40 and 42.

The gaps 48 described above may cause undesirable resin flow during the infusion process as will now be described with reference to FIGS. 7 and 8.

Referring to FIG. 7, during the resin infusion process, resin is admitted into the mould via the resin inlet channel 46. The resin inlet channel 46 has a generally omega-shaped cross section, and extends longitudinally and substantially centrally in the mould. Resin is admitted into one end of the channel 46, for example the end 54 shown in cross-section in FIG. 7, and the resin flows along the channel 46 in a generally spanwise direction S. Resin also flows out of the channel 46 in a generally chordwise direction C across the foam panel 42 and spar cap 40 in the mould as represented by the arrows 56 in FIG. 7. The aim of this arrangement is to achieve an angled flow front of the resin across and along the components 40, 42 as represented schematically by the shaded region 58 in FIG. 7.

However, and referring now to FIG. 8, when the resin reaches the longitudinally-extending gaps 48 between the spar cap 40 and the foam panels 42, the gaps 48 act as 'race tracks' for the resin, and the resin flows quickly along the gaps 48 in the spanwise direction S. The fast and uncontrolled resin flow along the gaps 48 can result in resin lock offs 60 forming, as shown in FIG. 8. The air contained in the lock off 60 cannot escape and so this region will not be infused. This lock off 60 may be present between individual pultrusions 44 of the spar cap 40.

The present invention provides a solution to this problem in the form of a method of making an elongate wind turbine blade extending longitudinally between a root end and a tip end in a spanwise direction, the method comprising:
a. providing an elongate mould tool extending longitudinally in a spanwise direction;
b. arranging an elongate spar structure in the mould tool, the spar structure extending longitudinally in the spanwise direction;
c. arranging core material adjacent to the spar structure;
d. providing resin-permeable material between the spar structure and the core material; and
e. administering resin into the mould during a resin infusion process, wherein the resin-permeable material restricts the flow of resin between the spar structure and the core material in the spanwise direction.

Steps b, c and d of the method may be performed in any order.

According to the present invention, resin-permeable material is provided between the spar structure and the core material. The resin-permeable material restricts the flow of resin in the spanwise direction at the interface between the spar structure and the core material as compared to the situation where resin-permeable material is not provided at these interfaces. Thus, the race track effect described above, and the associated resin lock offs, are effectively prevented, and a more controlled resin flow front is achieved in the chordwise direction.

The spar structure referred to above is a load-bearing structure and in preferred embodiments of the invention it is a spar cap comprising a stack of pultruded strips of reinforcing material as described previously. However, it should be appreciated that the invention is not limited in this respect and the spar structure may be another suitable load-bearing structure. The spar structure may be made of pre-cured material. For example the spar structure may be made of carbon-fibre reinforced plastic (CFRP).

The core material may be any suitable core material, for example of the type typically used as the core of sandwich panels. Preferably the core material is foam, for example polyurethane foam, but it may instead be balsa or another suitably-lightweight material. In preferred examples of the invention, the core material is in the form of panels that are arranged in abutment with the spar structure, as described earlier.

The resin-permeable material may be any compliant material that is capable of reducing the flow rate of resin at the interface between the spar structure and the core material. In preferred embodiments of the invention, the material is breather fabric, for example breather fabric made from polyester, nylon or blended fibreglass. Suitable breather fabrics include those produced by Tygavac Advanced Materials Ltd., such as the 'Econoweave', 'Airweave' and 'Ultraweave' series of fabrics. The breather fabric typically has a weight in the range of approximately 100-700 g/m$^2$, although other weights may be suitable. As an alternative to breather fabric, the resin-permeable material may include polystyrene beads, spun polyester, or sponge material. The material will typically undergo some compression during the moulding process, and suitable materials are those that still allow resin to flow (albeit at a reduced flow rate) at the interface between the spar structure and the core material when the resin-permeable material is compressed to such an extent.

The method may involve securing the resin-permeable material to the core material and/or to the spar structure. This has the advantageous effect of maintaining the breather fabric in the desired position during the layup process and during the subsequent infusion process. The resin-permeable material may be secured to the spar structure and/or to the core material when the associated component is arranged in the mould. For example the method may involve arranging the core material in the mould and subsequently attaching the resin-permeable to the core material, for example before the spar structures are arranged in the mould.

A particularly advantageous effect may be realised by pre-attaching the resin-permeable material to the spar structure or to the core material before arranging the blade components in the mould. For example in a particular example of the invention, the resin-permeable material is pre-applied to the core material before the core material is arranged in the mould. This operation can be performed offline and hence reduces the blade production time in the mould. The resin-permeable material may be secured to the core material and/or to the spar structure by any suitable means, for example it may be bonded by a suitable adhesive or secured using scrim tape.

During the resin-infusion process, the method may comprise administering resin into the mould in a direction transverse to the spanwise direction. Preferably the method comprises administering resin into the mould substantially in a chordwise direction, i.e. across the width of the mould.

The method may further comprise providing a resin inlet channel extending longitudinally in the spanwise direction through which the resin is administered into the mould during the resin infusion process, and preferably the elongate spar structure is positioned between the resin-permeable material and the resin inlet channel. This prevents resin lock offs between the spar structure and the core material.

The mould is preferably a blade shell mould. The mould may be a mould for making a half shell of a wind turbine blade. Alternatively the mould may be configured to make an entire wind turbine blade. As a further alternative, the mould may be for making a section of a wind turbine blade, for example in the case of a modular blade. Hence, the method may involve making only part of a wind turbine blade according to the present invention. For example, a mid-section of a blade may be made according to the above method, and the mid-section may subsequently be joined to a root and/or tip portion of the blade, or to another longitudinal section of the blade.

Accordingly, the present invention provides a wind turbine blade made in accordance with the above method, and a wind turbine comprising the wind turbine blade.

The invention therefore provides a wind turbine blade extending longitudinally between a root end and a tip end in a spanwise direction, the wind turbine blade having a blade shell made of fibre-reinforced plastic, and at least part of the blade shell comprising: an integral elongate spar structure extending longitudinally in the spanwise direction; core material arranged adjacent to the spar structure; and resin-permeable material provided between the spar structure and the core material.

The wind turbine blade is formed by resin infusion according to the method described above. During the resin-infusion process, the resin-permeable material serves to restrict the rate of flow of resin between the spar structure and the core material in the spanwise direction. The resin-permeable material substantially fills any gaps at the interfaces between the spar structure and the core material and eliminates the race-track effect at such interfaces.

Optional features described above in relation to the method are equally applicable to the invention when expressed in terms of a wind turbine blade, but these features will not be repeated herein for reasons of conciseness.

BRIEF DESCRIPTION OF THE DRAWINGS

The background to the present invention has already been described above with reference to FIGS. 1 to 3 in which.

Figure 1:
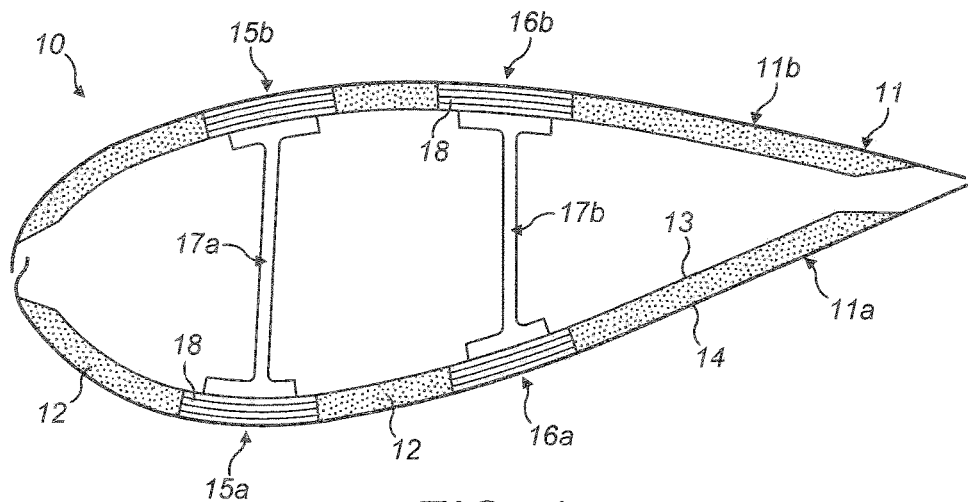
FIG. 1 is a schematic transverse cross-sectional view through a wind turbine blade having a fibre-reinforced shell of sandwich panel construction and having spar structures integrated with the shell and located between regions of core material.
Figure 2:
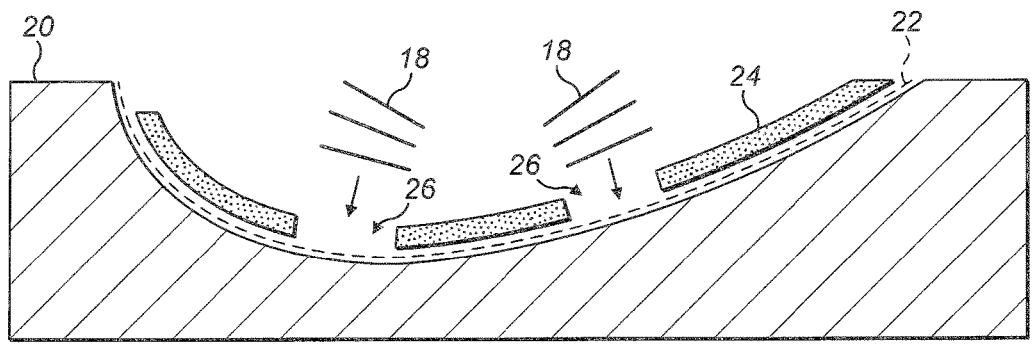
FIG. 2 is a schematic transverse cross-section through a wind turbine blade shell mould for making the blade shown in FIG. 1, and illustrating the core material and spar structure being arranged in the mould.
Figure 3:
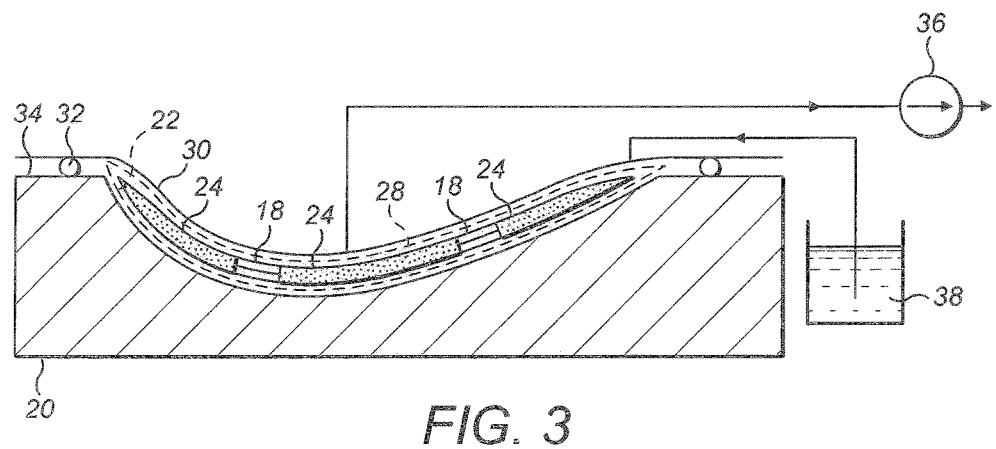
FIG. 3 illustrates a resin-infusion process for making the wind turbine blade of FIG. 1.
Figure 4:
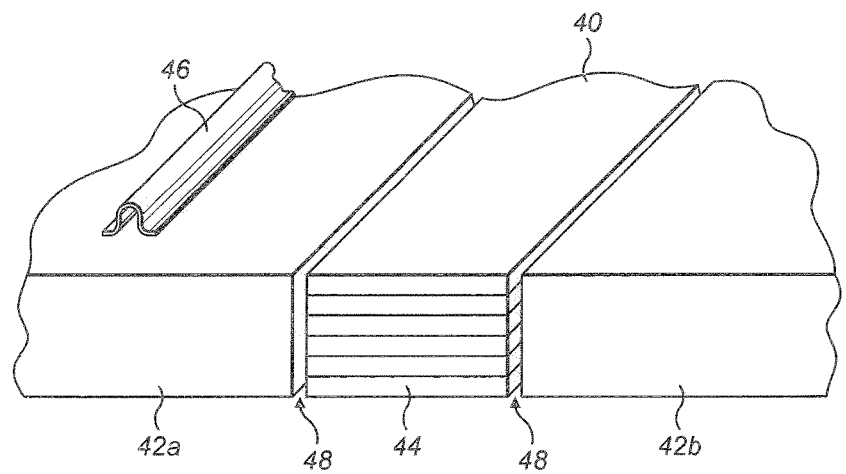
Figure 5:
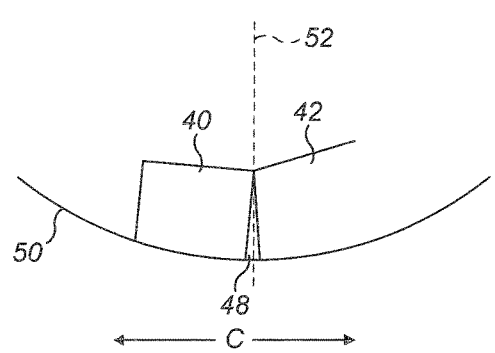
Figure 6:
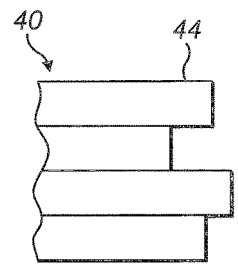
Figure 7:
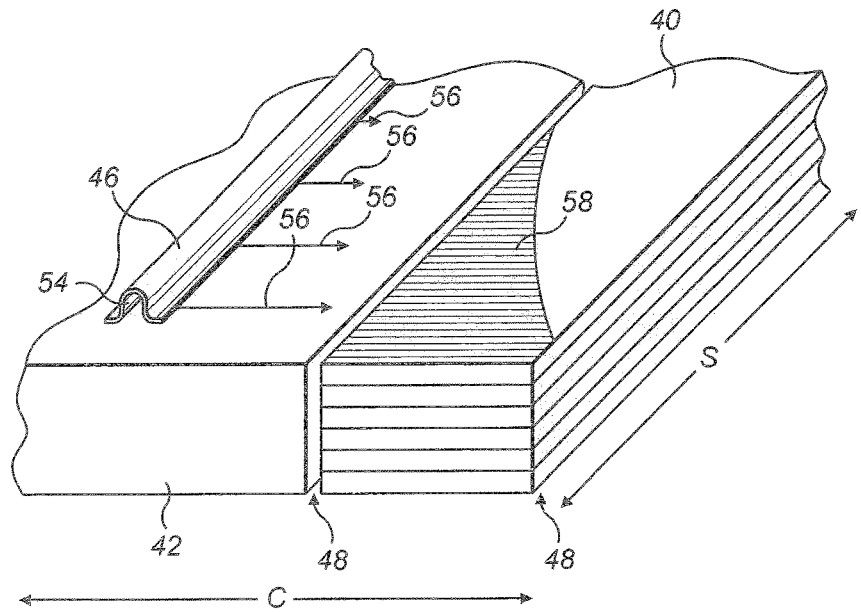
Figure 8:
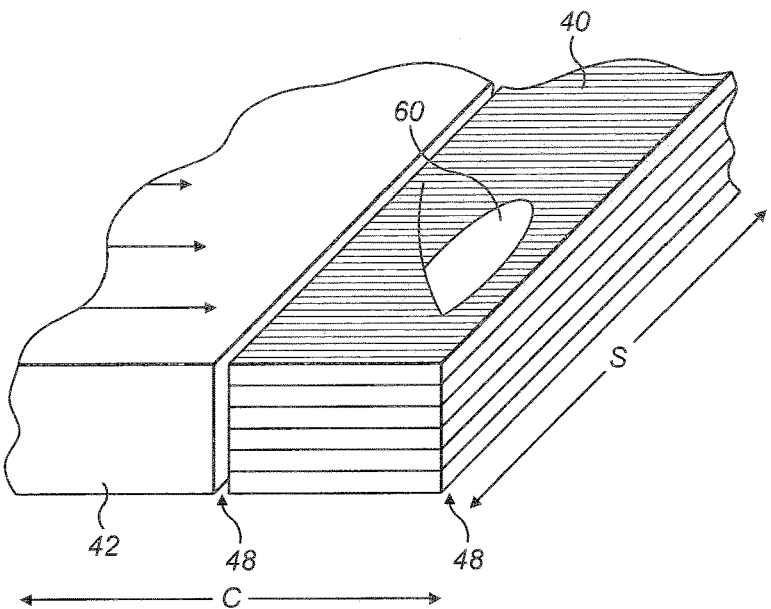

A particular problem addressed by the method of the present invention has also been described above with reference to FIGS. 4 to 8, in which:

FIG. 4 schematically illustrates longitudinal gaps at the interfaces between a spar structure and panels of core material when these components are arranged in a wind turbine blade mould;

FIG. 5 schematically illustrates how the curvature of a wind turbine blade mould causes a gap between abutting spar structures and core panels;

FIG. 6 is a schematic illustration of part of a spar structure comprising a stack of pultrusions and showing slight misalignments between the pultrusions;

FIG. 7 illustrates resin flow during a resin-infusion process, in which resin flows in a chordwise direction across the core panel and spar structure; and FIG. 8 illustrates a lock off created by uncontrolled resin flow in a spanwise direction at the interface between the core panel and the spar structure.

Figure 9:
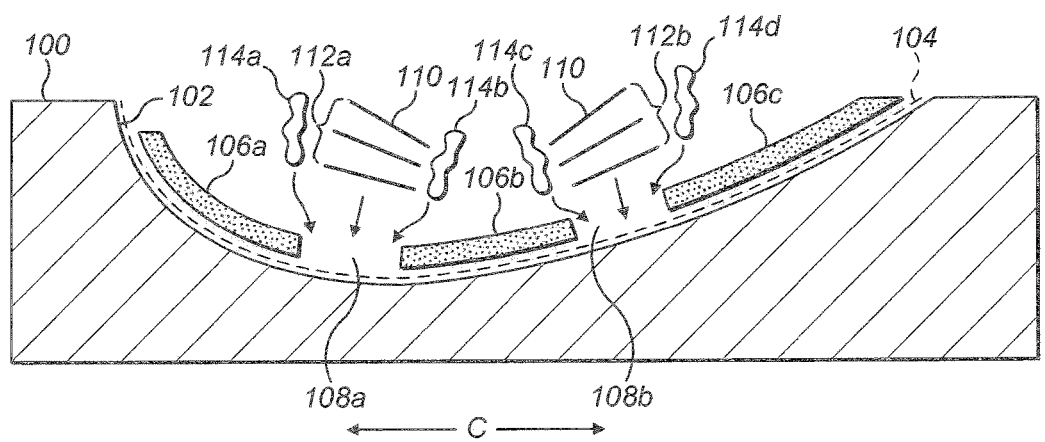
Figure 10:
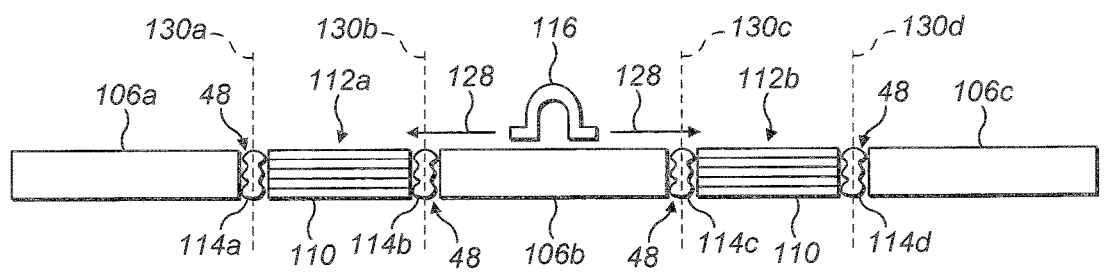
Figure 11:
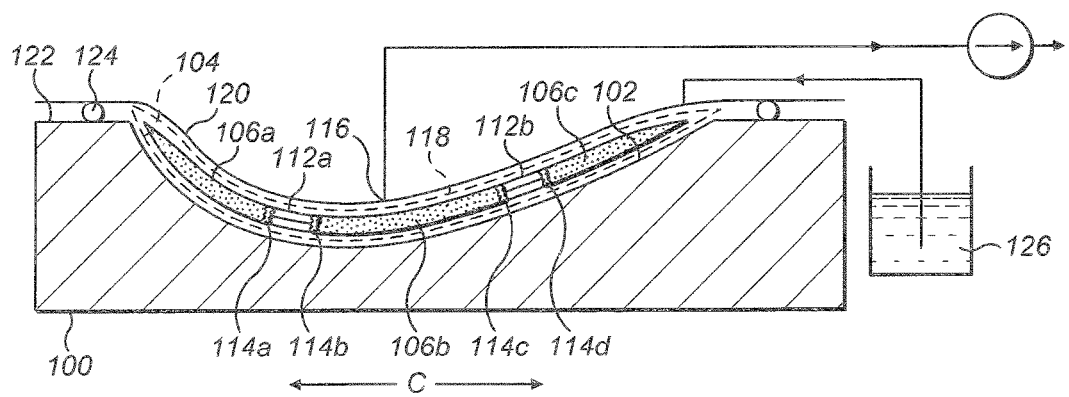
Figure 12:
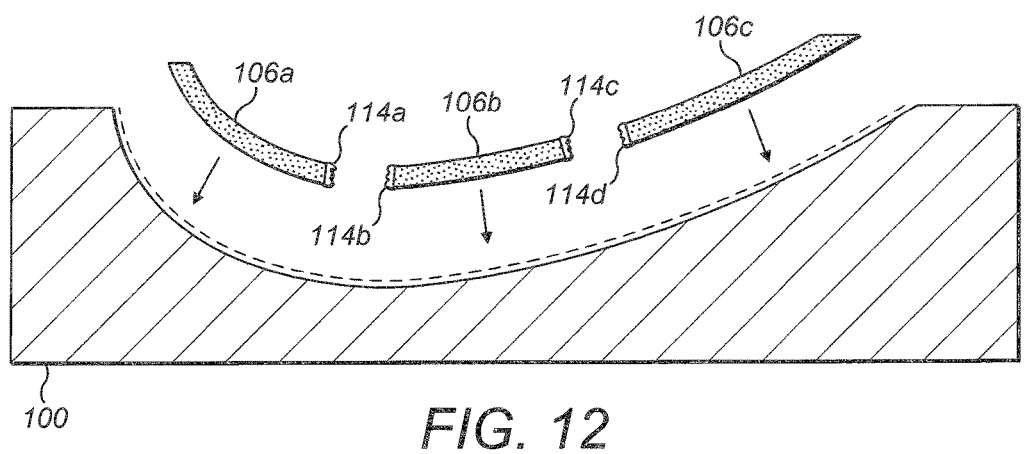

In order that the present invention may be more readily understood, a method of making a wind turbine blade in accordance with particular embodiments of the present invention will now be described in further detail with reference to the following figures, in which:

FIG. 9 is a schematic transverse cross-section through a wind turbine blade shell mould, and shows resin-permeable material being arranged in the mould between spar structures and panels of core material;

FIG. 10 is a schematic representation of a pair of spar structures arranged between panels of core material with resin-permeable material provided at the interfaces between the core panels and spar structures;

FIG. 11 illustrates a resin-infusion process for making a wind turbine blade according to the present invention; and FIG. 12 illustrates a further embodiment of the present invention in which resin-permeable material is pre-applied to core panels before the core panels are placed in the mould.

DETAILED DESCRIPTION

Referring now to FIG. 9, this is a cross section through a wind turbine blade shell mould 100. The mould 100 extends longitudinally in a spanwise direction perpendicular to the plane of the page. A surface 102 of the mould 100 exhibits a concave curvature in a chordwise direction C, corresponding to the curvature of the aerodynamic profile of the blade to be formed in the mould 100. The mould 100 is suitably-shaped for moulding a half shell of a wind turbine blade. In practice, two half shells may be moulded typically in separate moulds and the completed half shells are subsequently bonded together to form a complete blade, as will be readily apparent to persons skilled in the art. However, it should be appreciated that the present invention is not limited in this respect, and may instead be employed in other such moulding operations for example in which a complete blade is moulded in a single mould, or in which only a section of the blade is formed in the mould, such as in the case of a modular blade.

In order to form the blade half shell in the mould 100, one or more glass-fibre fabric layers 104 are arranged on the mould surface 102 to form the outer skin of the blade. A plurality of polyurethane foam panels 106*a-c* are then arranged on top of the glass-fibre layer(s). Three panels 106a-c are shown in the cross-sectional view of FIG. 9, although the number of panels may vary in other examples and/or at different spanwise locations in the mould 100, depending upon the structural requirements of the blade in such regions. The panels 106a-c are spaced apart from one another in the chordwise direction C such that a first spar region 108a is defined between a central panel 106b and a leading edge panel 106a and a second spar region 108b is defined between the central panel 106b and a trailing edge panel 106c. The spar regions 108a and 108b extend longitudinally in the spanwise direction of the mould 100.

A plurality of pultruded strips 110 are stacked one on top of another in the first spar region 108a to form a first spar cap 112a. The pultrusions 110 are pre-cured strips of carbon-fibre reinforced plastic (CFRP). A second spar cap 112b is formed by stacking a further plurality of pre-cured CFRP pultrusions 110 in the second spar cap region 108b.

In accordance with the present invention, breather fabric 114a-d is provided between the spar caps 112a and 112b and the foam panels 106a, 106b and 106c. The breather fabric 114 is in the form of longitudinal strips, which extend in the spanwise direction of the mould 100. In this example four strips of breather fabric 114a-d are arranged between the spar caps 112a and 112b and the adjacent foam panels 106a-c. Specifically, a first strip 114a of breather fabric is provided between the first spar cap 112a and the leading edge panel 106a; a second strip 114b of breather fabric is provided between the first spar cap 112a and the central panel 106b; a third strip 114c of breather fabric is provided between the second spar cap 112b and the central panel 106b; and a fourth strip 114d of breather fabric is provided between the second spar cap 112b and the trailing edge panel 106c. The strips 114a-d of breather fabric are not necessarily a continuous length and may comprise a plurality of individual lengths of breather fabric arranged generally end to end in the spanwise direction, and/or overlapping to an extent.

Referring now to FIG. 10, this is a schematic cross-sectional representation of the components once assembled in the mould. Here it can be seen that the foam panels 106a-c and spar caps 112a and 112b are arranged side by side and the breather fabric 114a-d is located between the foam panels 106a-c and the stacks of pultrusions 110 comprising the spar caps 112a and 112b. A resin inlet channel 116 is also shown in FIG. 10. The resin inlet channel 116 is identical to the resin-inlet channel 46 described above by way of background with reference to FIG. 7, and extends longitudinally and substantially centrally in the mould 100. For ease of illustration, the mould 100 and other blade components have been excluded from FIG. 10, and the foam panels 106a-c and spar caps 112a and 112b are shown in a flat formation whereas in reality the components would typically be arranged on the curved surface 102 of the mould 100, as shown in FIG. 9.

Referring now to FIG. 11, once the components have been arranged in the mould 100, one or more further layers of glass-fibre fabric 118 are arranged on top of the components to form the inner skin of the blade. The assembly is then covered with vacuum-bagging film 120, which is sealed against the mould flange 122 using sealing tape 124. A vacuum is created in the sealed region defined between the vacuum-bagging film 120 and the mould surface 102 and resin 126 is admitted into the sealed region via the resin inlet channel 116 shown in FIG. 10.

As described by way of background with reference to FIG. 7, the resin 126 flows out of the resin inlet channel 116 in a chordwise direction C through the mould 100, as represented by the arrows 56 in FIG. 7. Corresponding arrows 128 are shown in FIG. 10 to indicate the direction of resin flow in the chordwise direction C in the present invention. Referring again to FIG. 10, the resin inlet channel 116 is arranged adjacent the central foam panel 106b, hence the resin initially flows across the central foam panel 106b. When the resin reaches the respective interfaces 130b and 130c between the central panel 106b and the first and second spar caps 112a and 112b, the resin infuses into the breather fabric 114b and 114c at these locations. The resin then continues to flow in a chordwise direction C across the spar caps 112a and 112b until it reaches the respective interfaces 130a and 130d between the spar caps 112a and 112b and the respective leading edge and trailing edge panels 106a and 106c. The resin then infuses into the breather fabric 114a and 114d at these interfaces 130a and 130d before continuing to flow in a chordwise direction C across the respective leading and trailing edge panels 106a and 106c.

The breather fabric 114a-d at the respective interfaces 130a-d between the spar caps 112a and 112b and the foam panels 106a-c occupies the gaps 48 that were described above by way of background to the present invention with reference to FIGS. 4 to 6. The presence of the breather fabric 114a-d prevents the resin from racing in a spanwise direction at these interfaces 130a-d. Accordingly, the resin flows in a steady and controlled manner in the chordwise direction C across the foam panels 106a-c and the abutting spar caps 112a and 112b, such that lock-offs are substantially prevented.

In order to maintain the breather fabric 114a-d in position during the layup process and during the moulding process, the breather fabric 114a-d may be secured to the foam panels 106a-c using glue, scrim tape or other suitable means. The above method may therefore involve arranging the foam panels 106a-c in the mould 100 and thereafter securing the breather fabric 114a-d to the foam panels 106a-c before stacking the pultrusions 110 in the spar regions 108a and 108b between the panels 106a-c.

Referring now to FIG. 12, this shows an alternative example of the invention in which the breather fabric 114a-d is pre-applied to the sides of the foam panels 106a-c using scrim tape before the panels 106a-c are arranged in the mould 100. Pre-applying the breather fabric 114a-d to the foam panels 106a-c is particularly advantageous because this can be done offline, which can significantly reduce the time required to assemble the various components in the mould 100, and thereby reducing the blade production time.

In FIGS. 9 to 12, fours strips of breather fabric 114a-d have been provided at the interface between the foam panels and the spar caps. However, in an example, only strips 114a and 114d may be provided. The spar caps 112a and 112b are located between the two strips 114a, 114d and the resin inlet channel 116. By providing the strips of breather fabric in these locations eliminates the race track effect at the respective interfaces between the foam panels 106a, 106c and the spar caps 112a, 112b such that lock-offs are substantially prevented.

For the avoidance of doubt, the terms 'spanwise' and 'chordwise' are used herein for convenience and should not be interpreted in such a way as to unduly limit the scope of the present invention. 'Spanwise' is intended to mean a longitudinal direction, generally between the root and tip of a wind turbine blade or blade mould, and is not necessarily intended to mean directions parallel to the blade axis. 'Chordwise' is intended to mean a widthwise direction across the blade or mould, and is not necessarily intended to mean parallel to the blade chord.

Many modifications may be made to the above examples without departing from the scope of the present invention as defined in the accompanying claims.

The invention claimed is:

1. A method of making an elongate wind turbine blade extending longitudinally between a root end and a tip end in a spanwise direction, the method comprising:
   a. providing an elongate mould tool extending longitudinally in a spanwise direction;
   b. arranging an elongate spar structure in the mould tool, the spar structure extending longitudinally in the spanwise direction;
   c. arranging core material adjacent to the spar structure;
   d. providing resin-permeable material between the spar structure and the core material and securing the resin-permeable material to the core material and/or the spar structure; and
   e. administering resin into the mould during a resin infusion process, wherein the resin-permeable material restricts the flow of resin between the spar structure and the core material in the spanwise direction,
   wherein securing the resin-permeable material to the spar structure and/or to the core material is performed prior to arranging the blade components in the mould.

2. The method of claim 1 wherein the resin-permeable material is breather fabric.

3. The method of claim 1, further comprising bonding the resin-permeable material to the core material prior to arranging the core material in the mould.

4. The method of claim 1, wherein step (e) comprises administering resin into the mould in a direction transverse to the spanwise direction.

5. The method of claim 4, wherein step (e) comprises administering resin into the mould substantially in a chordwise direction.

6. The method of claim 1, further comprising providing a resin inlet channel extending longitudinally in the spanwise direction through which the resin is administered into the mould during the resin infusion process, wherein the elongate spar structure is positioned between the resin-permeable material and the resin inlet channel.

7. The method of claim 1 wherein the mould is a blade shell mould.

8. The method of claim 1, wherein the spar structure is a pre-cured component.

9. The method of claim 1, wherein the spar structure is made from carbon fibre reinforced plastic.

10. The method of claim 1, wherein the spar structure comprises a stack of strips of reinforcing material.

11. The method of claim 10, wherein the strips are pultrusions.

12. The method of claim 1, wherein the core material is foam or balsa.

13. The method of claim 1, wherein the core material comprises one or more panels.

14. A wind turbine blade made in accordance with the method of claim 1.

15. A wind turbine having the wind turbine blade of claim 14.

* * * * *